United States Patent [19]
Buchser

[11] 3,900,220
[45] Aug. 19, 1975

[54] THREAD ADAPTOR

[75] Inventor: William J. Buchser, Evansville, Ind.

[73] Assignee: Whirlpool Corporation, Benton Harbor, Mich.

[22] Filed: Dec. 3, 1973

[21] Appl. No.: 420,971

[52] U.S. Cl. ................. 285/177; 285/259; 403/299
[51] Int. Cl.² ......................................... F16L 25/00
[58] Field of Search ........... 285/177, 382, 238, 239, 285/259; 403/343, 365, 282, 284, 299

[56] References Cited
UNITED STATES PATENTS

| | | | |
|---|---|---|---|
| 1,748,774 | 2/1930 | Kellog et al. | 285/177 |
| 2,091,852 | 8/1937 | Hinds | 285/259 X |
| 2,315,792 | 4/1943 | Hoss | 285/177 X |
| 3,381,982 | 5/1968 | Elek | 285/177 X |
| 3,602,531 | 8/1971 | Patry | 285/177 |
| 3,817,561 | 6/1974 | Kay | 285/177 |

FOREIGN PATENTS OR APPLICATIONS

| | | | |
|---|---|---|---|
| 1,163,414 | 9/1969 | United Kingdom | 285/177 |
| 145,755 | 11/1929 | Switzerland | 285/177 |

*Primary Examiner*—Richard J. Scanlan, Jr.
*Assistant Examiner*—Wayne L. Shedd
*Attorney, Agent, or Firm*—Hofgren, Wegner, Allen, Stellman & McCord

[57] ABSTRACT

A structure for providing a threaded connection on an annular wall formed of a soft material. The threaded connection is provided in the form of an annular sleeve element having a friction fit with the annular wall and means on the annular element for interlocking it to the annular wall. The sleeve element further defines threaded means for threaded connection of another element thereto. The sleeve element is formed of a relatively hard material for improved threaded connection thereto.

13 Claims, 5 Drawing Figures

PATENTED AUG 19 1975						3,900,220
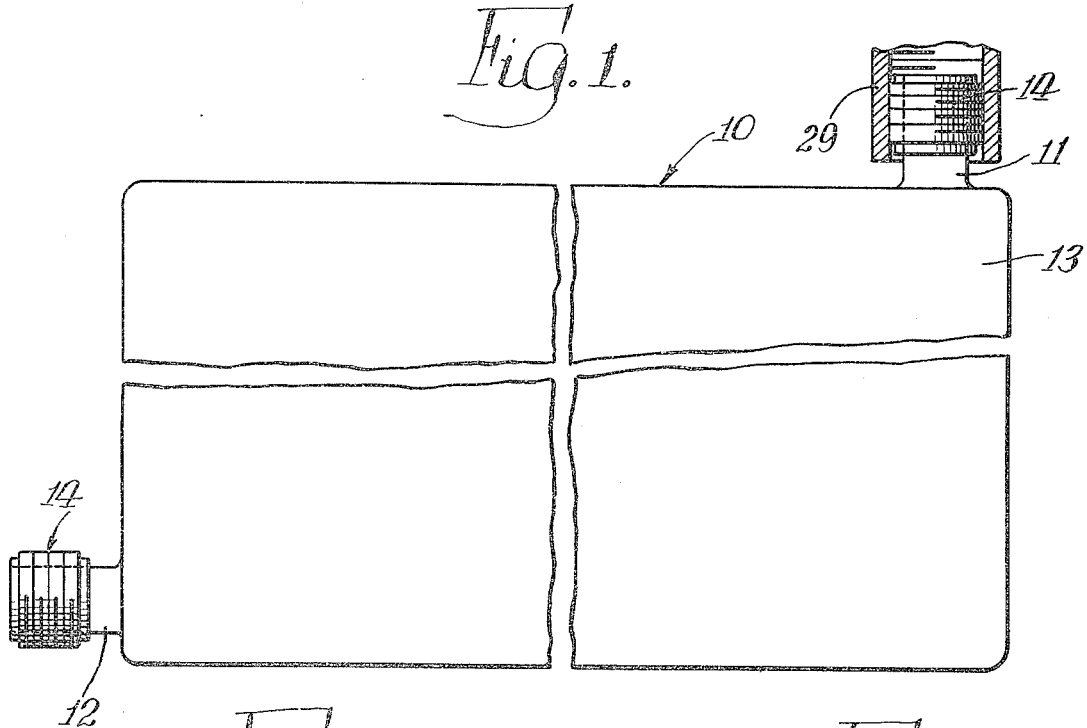
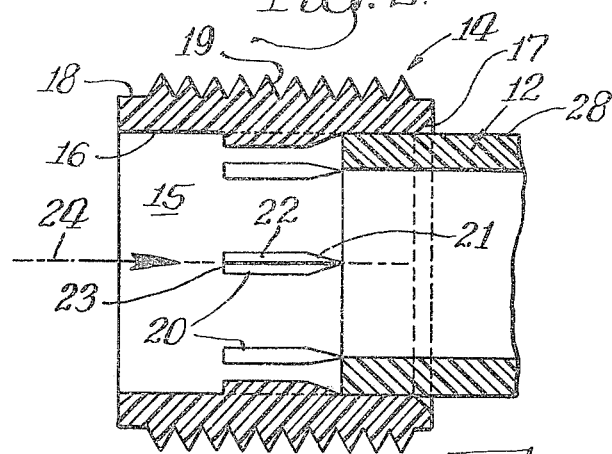
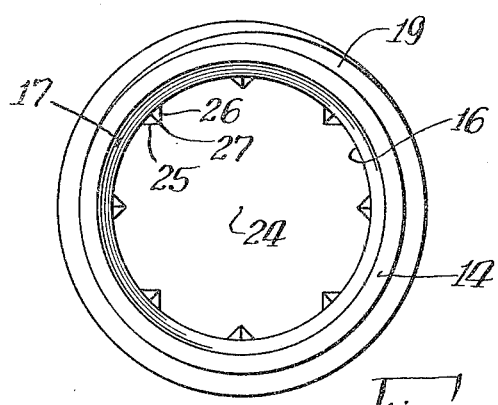
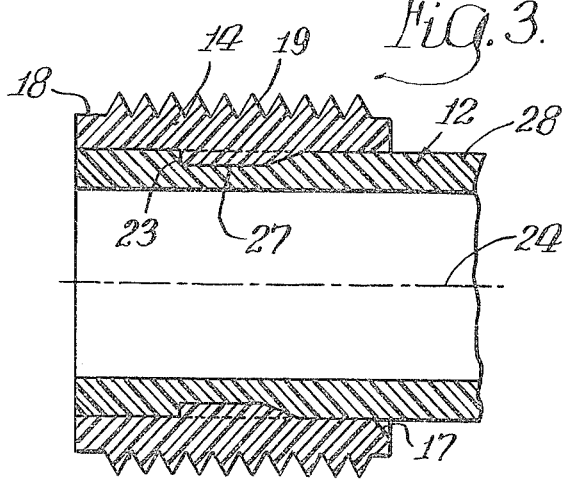
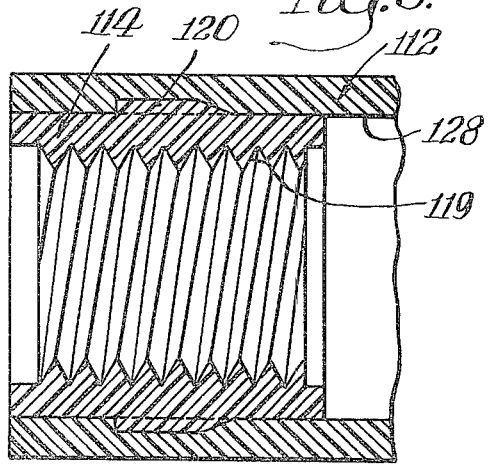

THREAD ADAPTOR

BACKGROUND OF THE INVENTION

1. Field of the Invention

This invention relates to means for providing threaded connections, and in particular, to means for providing tubular threaded connections as for conducting fluid flow. 2. Description of the Prior Art At times it is desirable to provide a threaded connection of a tube to an article formed of relatively soft material, such as a soft plastic. Illustratively, water reservoirs may be provided with tubular inlets and outlets which are molded integrally with the reservoir and, thus, are formed of relatively soft plastic material. Where low pressures are involved, push-on connections have been found to be reasonably satisfactory. However, where relatively high pressures, such as up to 125 pounds per square inch are involved, it has been found that the conventional slip-on connection is unsatisfactory.

Tube connectors and adapters have been developed utilizing slip-on portions and threaded portions. One example of such an adapter is that shown in Hoss U.S. Pat. No. 2,315,792. Therein an adapter is shown to include a threaded portion and an internally tapered socket portion for receiving the end of a tube. Serrations may be provided in the socket portion for preventing rotation of the tube about the axis thereof relative to the adapter. In the Hoss structure, the tube may be readily removed by a simple axial outward urging of the tube from the adapter and, thus, the adapter is not arranged for use at relatively high pressure.

In U.S. Pat. No. 3,602,531 of Leon R. Patry, a tubing coupler is provided having opposite ends of different diameter, each having axially extending narrow ribs narrowing toward the outer ends of the coupler. In Patry, similarly as in Hoss, the maintained association of the tube with the coupling element is substantially by means of the frictional fit therebetween.

SUMMARY OF THE INVENTION

The present invention comprehends an improved threaded connection structure for providing a threaded connection on an annular wall formed of a soft material, such as a soft plastic. The threaded connection structure is defined by an annular element having radially inner and outer surfaces, the element being formed of a material substantially harder than the wall material, a radially projecting rib formed on one of the surfaces having a tapered axially inner end and an axially outer end defining a radial shoulder, and a coaxial thread formed in the other of the surfaces, the one surface being adapted to fit in facial engagement around the annular wall with the element locked to the annular wall by the radial shoulder extending into the annular wall.

More specifically, in the illustrated embodiment, the threaded connection structure is formed of a plastic material with a plurality of radially inwardly projecting ribs formed on the radially inner surface of the annular element and with the thread formed on the radially outer surface thereof.

The annular element has an interference fit with the annular wall. The annular element is locked to the annular wall by the positive interlocking action of the radial shoulder at the outer end of the rib as the result of the projection of the rib into the soft material of the annular wall in the assembled relationship of the threaded connection structure.

A plurality of such ribs may be provided in circumferentially spaced relationship about the axis of the annular element. Each rib may be disposed substantially midway between the axially inner and outer ends of the thread. The rib may have a substantial axial length, such as one-third that of the length of the thread, and may include a constant thickness midportion between the tapered end and radial shoulder with the constant thickness portion having a length greater than the axial length of the tapered end.

The annular element may further define a chamfered surface at the inner end of the radially inner surface for facilitating pressing of the element coaxially onto the annular wall.

The threaded connection structure of the present invention provides a high strength thread on a relatively soft plastic article which is effectively retained to the article by a simple press-on operation so as to provide a high pressure connection to the article such as capable of handling pressures of up to 125 pounds per square inch or more.

Thus, the threaded connection structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary front elevation with portions broken away illustrating a plurality of threaded connector structures embodying the invention connected to a reservoir formed of a soft plastic material;

FIG. 2 is a fragmentary enlarged diametric section of a threaded connection structure embodying the invention being connected to an annular wall of the reservoir;

FIG. 3 is a fragmentary enlarged diametric section of a threaded connection structure embodying the invention illustrating the completed assembly of the threaded connection structure to the annular wall;

FIG. 4 is an end view of the threaded connection structure; and

FIG. 5 is a diametric section illustrating a modified form of the threaded connection structure.

DESCRIPTION OF THE PREFERRED EMBODIMENT

In the exemplary embodiment of the invention as disclosed in the drawing, an article generally designated 10 formed of relatively soft material, such as plastic, is shown to illustratively define a water reservoir having an inlet 11 and an outlet 12, each defining an annular wall projecting outwardly from the main body 13 of the reservoir. The annular walls 11 and 12 may be formed integrally with the body 13 and, thus, comprise relatively soft connecting portions of the reservoir. To permit the connection of a conduit or the like to the annular reservoir wall, a threaded connection structure generally designated 14 is provided.

As shown in FIGS. 2–4, the threaded connection structure comprises an annular element having a through bore 15 defining a radially inner surface 16 including a chamfered surface 17 at the axially inner end of the element for facilitating installation of connection structure 14 on walls 11 and 12. The element further defines a radially outer surface 18 having formed therein a thread 19.

A plurality of ribs 20 are formed on the inner surface 16 of the annular element. Each rib includes a tapered axially inner end 21, a constant thickness mid-portion 22, and an axially outwardly facing radial shoulder 23 defined by a plane perpendicular to the axis 24 of the element. As seen in FIG. 4, each rib is defined by a pair of planar surfaces 25 and 26 intersecting to define a sharp longitudinal inner edge 27 adapted to penetrate into the outer surface 28 of wall 12 as shown in FIG. 3. In the illustrated embodiment, eight such ribs are provided on the inner surface 16 in spaced circumferential relationship about axis 24.

The diameter of inner surface 16 is preselected to provide a tight, interference-type fit with the outer surface 28 of the outlet 12. Thus, when the annular element 14 is pressed onto the outlet, a tight, secured engagement results therebetween. Further, to effectively interlock element 14 to outlet annular wall 12, the radial shoulders 23 define positive abutments with the deformed softer material of the annular wall 12 thereby effectively positively locking the annular element to the annular wall, as seen in FIG. 3. It has been found that with such a structure, wherein the annular element 14 is formed of a polyphenylene oxide polymer plastic, the connection is capable of handling relatively high pressures, such as up to 125 pounds per square inch or more notwithstanding the formation of the element 13 of relatively soft plastic material.

As will be obvious to those skilled in the art, the invention comprehends a reverse arrangement of the annular element 14 and annular wall 12 wherein the annular element is provided with a female thread 119, as shown in FIG. 5. Thus, the annular element 114, as shown therein, is provided with a plurality of radially outwardly projecting ribs 120 which bite into the inner surface 128 of the annular wall 112. The connection structure of FIG. 5 functions similarly to that of FIGS. 1-4 in providing a positively retained threaded connection to a relatively soft plastic element by means of a simple press-on installation.

As shown in FIG. 1, a tubular element 29 may be threaded to the connector 14 in a conventional manner. In connection with the structure of FIG. 5, the tubular element would obviously be provided with external threads for engagement with the female thread 119. In making the threaded connection, the ribs 20 and 120 not only maintain the axial disposition of the connecting element to the soft annular wall, but also prevent rotation of the annular element about the axis thereof.

The threaded connection 14 is extremely simple and economical of construction and is readily installed on the relatively soft plastic article.

The foregoing disclosure of specific embodiments is illustrative of the broad inventive concepts comprehended by the invention.

Having described the invention, the embodiments of the invention in which the exclusive property or privilege is claimed are defined as follows:

1. Structure for providing a threaded connection on an annular wall formed of a soft material, comprising an annular element having radially inner and outer surfaces, said element being formed of a material substantially harder than said wall material, a radially projecting rib formed on one of said surfaces having a tapered axially inner first end, an opposite axially outer second end defining a radial shoulder, and a constant cross section mid-portion between said ends, and a coaxial thread formed in the other of said surfaces, said one surface being adapted to fit in facial engagement with said annular wall with said element locked to the annular wall by the radial shoulder extending into the annular wall against axially outward withdrawal from the annular wall.

2. The connection structure of claim 1 wherein said rib is disposed radially of said thread.

3. The connection structure of claim 1 wherein said rib is disposed substantially midway between the opposite ends of said thread.

4. The connection structure of claim 1 wherein said rib is formed on said radially inner surface of the annular element and said inner surface is adapted to fit about said annular wall.

5. The connection structure of claim 1 wherein additional ribs are provided on said one surface spaced circumferentially coaxially from said first said rib.

6. The connection structure of claim 1 wherein said annular element comprises an injection molded sleeve.

7. The connection structure of claim 1 wherein said rib has an axial length substantially one-third the axial length of said thread.

8. The connection structure of claim 1 wherein said annular element one surface has a diameter preselected to have an interference fit with said annular wall.

9. Structure for providing a threaded connection on an annular wall formed of a soft plastic material, comprising an annular element having radially inner and outer surfaces, said element being formed of a plastic material substantially harder than said wall plastic material, a plurality of radially inwardly projecting ribs formed on said radially inner surface each having a tapered axially inner first end, an opposite axially outer second end defining a radial shoulder, and a constant cross section mid-portion between said ends, and a coaxial thread formed in said radially outer surface, said radially inner surface being adapted to fit in facial engagement with said annular wall with said element locked to the annular wall by the radial shoulder extending into the annular wall against axially outward withdrawal from the annular wall.

10. The connection structure of claim 9 wherein said inner surface has a diameter preselected to have an interference fit with the outer surface of said annular wall.

11. The connection structure of claim 9 wherein said rib further defines a constant thickness mid-portion.

12. The connection structure of claim 9 wherein said rib further defines a constant thickness mid-portion having an axial length greater than the axial length of said tapered end.

13. The connection structure of claim 9 wherein said annular element further defines a chamfered surface at said first end of said radially inner surface for facilitating pressing of said element coaxially onto said annular wall.

* * * * *